United States Patent Office 2,851,454
Patented Sept. 9, 1958

2,851,454

1,2-EPOXY-3,17-DIOXYGENATED ANDROSTANE DERIVATIVES AND THEIR REDUCTION

Raphael Pappo, Skokie, and Willard M. Hoehn, Wilmette, Ill., assignors to G. D. Searle & Co., Chicago, Ill., a corporation of Delaware No Drawing. Application August 2, 1957
Serial No. 675,809

7 Claims. (Cl. 260—239.55)

The present invention relates to steroidal epoxides. More particularly, it is concerned with 1,2-epoxy-3,17-dioxygenated androstane derivatives, and to methods for the conversion of such epoxy compounds to androstane-1,3,17-triols.

Compounds of the present invention can be represented by the general structural formula

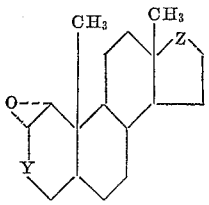

In this structural formula the terms Y and Z can each represent a carbonyl (CO) group, a hydroxymethylene (CHOH) group, or a (lower)alkanoyloxymethylene group of the type CHO-(lower)alkanoyl wherein the lower alkanoyl radical is the acyl radical of an alkanoic acid having fewer than nine carbon atoms. The term "lower alkanoyl" therefore includes such acyl radicals as formyl, acetyl, propionyl, butyryl, valeryl, hexanoyl, heptanoyl, octanoyl, and branched-chain isomers thereof.

Compounds of the foregoing structural formula can be manufactured by the epoxidation of a corresponding 1-androstene derivative with a suitable peroxidic reagent. Such reagents can be selected from among a group comprising hydrogen peroxide, peralkanoic acids, and peroxy carboxylic acids of the aromatic series. For the manufacture of compounds in which the term Y represents a carbonyl group, a particularly suitable reagent is alkaline hydrogen peroxide. In representative cases in which the epoxidation reaction is conducted with this reagent, in a lower alkanol as a solvent, the desired epoxide separates from the mixture within a few minutes, and can be recovered by filtration. The desired epoxide can also be recovered by concentrating the reaction mixture by distillation under reduced pressure. In order to keep competing oxidation reactions to a minimum, it is desirable to avoid excessive reaction times, and for this purpose reaction periods of less than about 30 minutes are generally recommended.

While compounds of this invention in which the term Y represents a hydroxymethylene group are also obtainable by epoxidation of the 1,2-double bond with a suitable peroxidic reagent, such compounds are more easily obtainable by reduction of the carbonyl analog with sodium borohydride. This reduction is carried out by treating a solution or suspension of the steroid in an unreactive medium with sodium borohydride. The term "unreactive" is used throughout this disclosure to designate a reaction medium which is of a relative degree of unreactivity such that it does not react with the reducing agent at a rate which impedes the reduction of the steroidal starting material; the term is not used to designate chemical inertness. In employing sodium borohydride as a reducing agent, suitable unreactive media are those comprising water and lower alkanols. Thus, by the reduction of 1,2-epoxyandrostane-3,17-dione in aqueous methanol, the product obtained is predominantly 1,2-epoxyandrostane-3β,17β-diol, with small amounts of other stereoisomers.

The epoxides of this invention have hormonal and other pharmacological properties. For example, they are useful androgenic and anabolic agents, and can be employed to produce androgenic effects and to promote the metabolic retention of nitrogen. The epoxides are also useful as starting materials in the manufacture of 1-hydroxyandrostane derivatives. Thus, when any of the epoxides encompassed by this invention, in a solution or suspension in an unreactive medium such as an aliphatic ether or tetrahydrofuran, is treated with lithium aluminum hydride, there occurs reductive cleavage of the 1,2-epoxide, along with reduction of any oxo or acyloxy groups at positions 3 and 17, with the formation of a mixture of androstane-1,3,17-triols, from which androstane-1α,3β,17β-triol is readily isolated. In carrying out this reduction process on epoxides of this invention in which either or both of the terms Y and Z represent carbonyl groups, better results can be achieved by conducting the reduction as a stepwise operation employing both sodium borohydride and lithium aluminum hydride as reducing agents. Thus, the reaction sequence which comprises reducing 1,2-epoxyandrostane-3,17-dione in aqueous methanol with sodium borohydride, followed by reducing the resulting 1,2-epoxyandrostane-3β,17β-diol in tetrahydrofuran with lithium aluminum hydride, gives good results in the preparation of androstane-1α,3β,17β-triol. The same compound is obtained directly by the reduction of any of the epoxides of this invention with lithium aluminum hydride, in an unreactive medium such as ethyl ether, isopropyl ether, butyl ether, or tetrahydrofuran. It is also obtained by successive treatment with sodium borohydride and lithium aluminum hydride of an epoxide in which either or both of the terms Y and Z represent alkanoyloxymethylene groups.

The androstane-1,3,17-triols which result from the described processes produce useful pharmacological effects upon the central nervous system. Thus, they are barbiturate potentiators, as shown by their ability to produce a prolongation of the sleeping period induced by hexobarbital.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degree centigrade (° C.) and quantities of materials in parts by weight.

*Example 1*

To a stirred solution of 3 parts of 1-androstene-3,17-dione in 160 parts of methanol are added simultaneously and in divided portions a total of 18 parts of a 30% hydrogen peroxide solution and a 4-molar solution of sodium hydroxide containing a total of 2.6 parts of sodium hydroxide. The reaction mixture is maintained at about 0–10° C. for two days and is then partitioned with 350 parts of benzene and 400 parts of water. The separated benzene phase is washed with several portions of 1% sodium hydroxide solution, and with several portions of water, following which it is rendered anhydrous, filtered, and brought to dryness by distillation of the benzene under reduced pressure. Crystallization of the residue from a mixture of methylene chloride and benzene affords 1,2-epoxyandrostane-3,17-dione which melts at about 246–247° C., after some prior sublimation. The specific rotation of this compound is about +189° in chloroform solution. The structural formula is

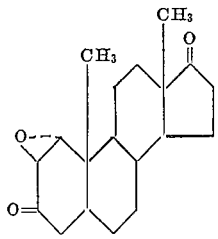

*Example 2*

A stirred suspension of 10 parts of 1,2-epoxyandrostane-3,17-dione in 120 parts of methanol is treated with a solution of 2.5 parts of sodium borohydride in 30 parts of water. As the reaction proceeds, the mixture becomes homogeneous. After a reaction period of 2 hours at about 25° C., the crude reaction product is precipitated by dilution with water, and collected on a filter. Upon recrystallization from butanone there is obtained 1,2-epoxyandrostane-3β,17β-diol as solvated crystals which lose solvent of crystallization at about 170° C. and melt with decomposition over the range of about 195–205° C. This compound has the structural formula

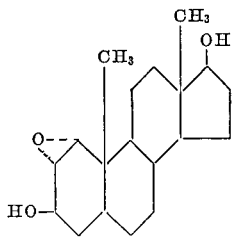

The same 1,2-epoxyandrostane-3β,17β-diol is obtained by the substitution of 10 parts of 1,2-epoxy-17β-hydroxyandrostan-3-one for the 1,2-epoxyandrostane-3,17-dione in the foregoing procedure.

*Example 3*

A solution is prepared from 1.05 parts of 17β-acetoxy-1-androsten-3-one and 12 parts of methanol. With external cooling to maintain the temperature at about 15–20° C., there are added, with stirring, 1.11 parts of 30% hydrogen peroxide and then 0.18 part of a 10% solution of sodium hydroxide in methanol. Within about 10 minutes a solid product separates. This product is collected on a filter and washed with methanol. It is 1,2-epoxy-17-acetoxyandrostan-3-one which melts at about 160–161° C. and has the structural formula

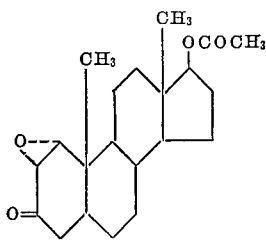

*Example 4*

A solution of 5 parts of 17β-hydroxy-1-androsten-3-one, 100 parts of pyridine and 30 parts of propionic anhydride is allowed to stand at about 25° C. for 24 hours. With the aid of an external cooling bath to moderate the exothermic reaction, unreacted propionic anhydride is decomposed by the cautious addition of water, after which the reaction mixture is poured, with stirring, into several times its volume of water. The insoluble product is collected, washed with water and crystallized from petroleum ether to afford 17β-propionoxy-1-androsten-3-one. This compound exhibits an ultraviolet absorption maximum at about 231 millimicrons.

*Example 5*

To a stirred reaction mixture prepared from 2.2 parts of 17β-propionoxy-1-androsten-3-one and 28 parts of methanol, and maintained at about 15–20° C. with external cooling, there are added 2.2 parts of 30% hydrogen peroxide and then 0.36 part of a 10% solution of sodium hydroxide in methanol. After about 15 minutes the insoluble product is collected on a filter and washed with cold methanol. A higher yield of this product can be obtained by vaporization of a portion of the methanol under reduced pressure, prior to filtration. This compound is 1,2-epoxy-17β-propionoxyandrostan-3-one. It exhibits infrared absorption maxima at about 5.75, 5.79, 8.40 and 11.44 microns, and has the structural formula

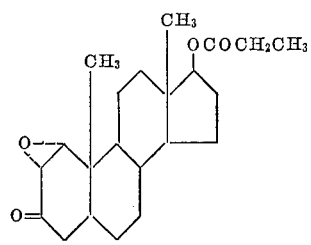

*Example 6*

A solution of 2 parts of 1,2-epoxyandrostane-3β,17β-diol in 30 parts of pyridine and 12 parts of acetic anhydride is allowed to stand at about 25° C. for 20 hours. Unreacted acetic anhydride is decomposed by the cautious addition of water in small portions, with external cooling. The reaction product is then precipitated by the gradual dilution of the mixture with several times its volume of water. The insoluble product is collected and washed with water. It is 1,2-epoxyandrostane-3β,17β-diol diacetate which has prominent infrared absorption maxima at about 5.75, 7.26, 9.57, and 11.42 microns, and has the structural formula

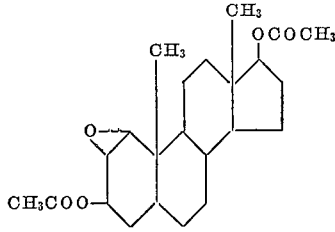

By the foregoing procedure, with the substitution of 12 parts of propionic anhydride for the acetic anhydride, the compound obtained is 1,2-epoxyandrostane-3β,17β-diol dipropionate.

*Example 7*

A reaction mixture prepared from 2.5 parts of 1,2-epoxy-17β-acetoxyandrostan-3-one, 80 parts of ethanol and 6 parts of 20% sodium hydroxide solution is heated under reflux for 10 minutes. The cooled mixture is diluted with 500 parts of water, and the gummy precipitate is separated by decantation of the aqueous phase and crystallized from aqueous methanol. Further purification by recrystallization from aqueous methanol affords a solvated preparation of 1,2-epoxy-17β-hydroxyandrostan-3-one melting at about 120–123° C. This compound exhibits prominent infrared absorption maxima at about 2.85, 5.85, 6.90, 8.93, 9.42, 10.74, and 11.42 microns. Ultraviolet absorption appearing at about 266 millimicrons is indicative of an unsaturated material customarily present in a minor proportion. The structural formula of 1,2-epoxy-17β-hydroxyandrostan-3-one is as follows

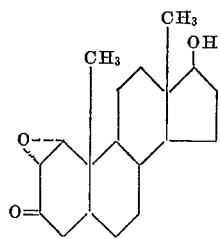

*Example 8*

1,2-epoxyandrostane-3β,17β-diol (6.5 parts) is added to a solution of 5 parts of lithium aluminum hydride in 350 parts of anhydrous tetrahydrofuran. The reaction mixture is heated under reflux for 4 hours, following which the resulting suspension is cooled in an ice bath and treated, in succession, with 5.3 parts of water, 4.75 parts of 20% sodium hydroxide solution, and 18.2 parts of water. The mixture is then diluted with an equal volume of ether and filtered; the filtrate is brought to dryness by vaporization of the solvents. By recrystallization of the residue from butanone there is obtained androstane-1α,3β,17β-triol melting at about 236–238° C. This compound has the structural formula

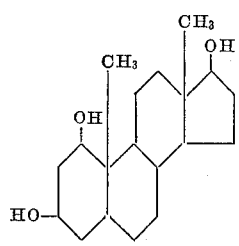

The same androstane-1α,3β,17β-triol is obtained by the substitution of 6.5 parts of any of the following epoxides for the 1,2-epoxyandrostane-3β,-17β-diol in the foregoing procedure.

1,2-epoxyandrostane-3,17-dione
1,2-epoxy-17β-acetoxyandrostan-3-one
1,2-epoxy-17β-propionoxyandrostan-3-one
1,2-epoxyandrostane-3β,17β-diol diacetate
1,2-epoxyandrostane-3β,17β-diol dipropionate
1,2-epoxy-17β-hydroxyandrostan-3-one

What is claimed is:
1. A compound of the structural formula

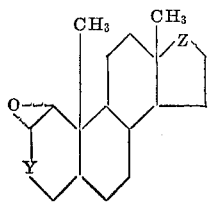

wherein Y and Z are members of the class consisting of the carbonyl group, the hydroxymethylene group, and groups of the formula CHO-(lower)alkanoyl 2. 1,2-epoxyandrostane-3,17-dione.
3. 1,2-epoxy-17β-(lower) alkanoyloxyandrostan-3-one.
4. 1,2-epoxy-17β-acetoxyandrostan-3-one.
5. 1,2-epoxyandrostane-3β,17β-diol.
6. A process which comprises: treating a compound having the structural formula

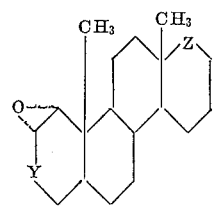

wherein Y and Z are members of the class consisting of the carbonyl group, the hydroxymethylene group, and groups of the formula CHO-(lower)alkanoyl in an unreactive medium, with lithium aluminum hydride, and isolating an androstane-1,3,17-triol.

7. A process which comprises: treating a compound having the structural formula

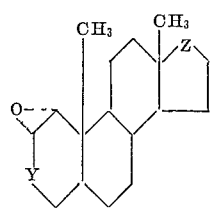

wherein Y and Z are members of the class consisting of the carbonyl group, the hydroxymethylene group, and groups of the formula CHO-(lower)alkanoyl in an unreactive medium, with sodium borohydride, isolating the resulting product; treating said product in an unreactive medium with lithium aluminum hydride; and isolating an androstane-1,3,17-triol.

No references cited.